Sept. 14, 1943. J. W. CHAMBERLIN ET AL Re. 22,375

CLEANING TEXTILE AND SIMILAR MATERIALS

Original Filed March 6, 1937 11 Sheets-Sheet 1

INVENTORS.
JOHN W. CHAMBERLIN
REX EARL BASSETT, Jr.
BY Maurice W. Green
ATTORNEYS.

CLEANING TEXTILE AND SIMILAR MATERIALS

Original Filed March 6, 1937 11 Sheets-Sheet 2

INVENTORS
JOHN W. CHAMBERLIN
REX EARL BASSETT, Jr.
BY Maurice W. Green
ATTORNEYS.

CLEANING TEXTILE AND SIMILAR MATERIALS

Original Filed March 6, 1937 11 Sheets-Sheet 3

INVENTORS.
JOHN W. CHAMBERLIN
REX EARL BASSETT, Jr.
BY Maurice W. Green
ATTORNEYS Sept. 14, 1943. J. W. CHAMBERLIN ET AL Re. 22,375
CLEANING TEXTILE AND SIMILAR MATERIALS
Original Filed March 6, 1937 11 Sheets-Sheet 4
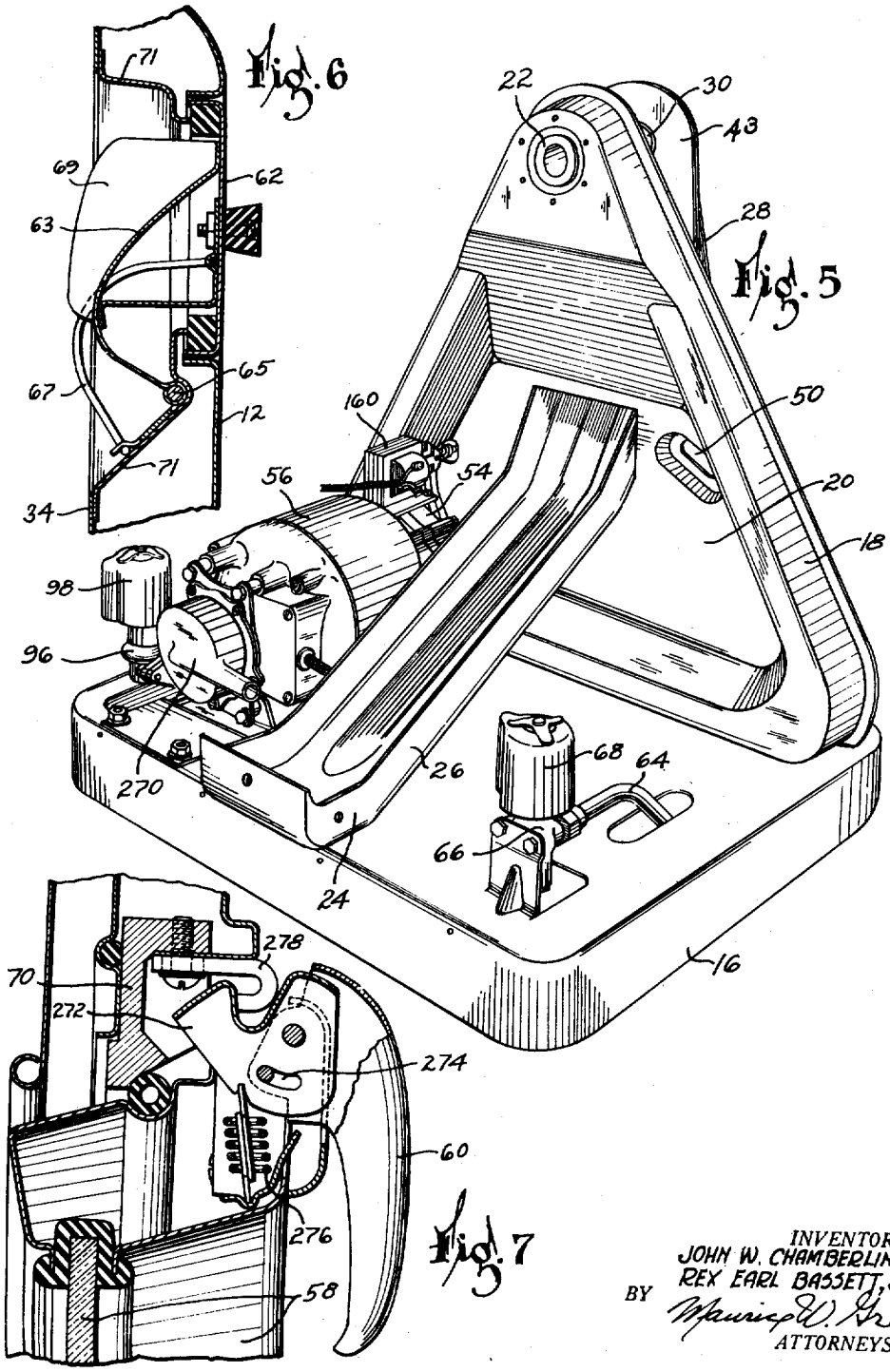
INVENTORS
JOHN W. CHAMBERLIN
REX EARL BASSETT, Jr.
BY Maurice W. Green
ATTORNEYS.

CLEANING TEXTILE AND SIMILAR MATERIALS

Original Filed March 6, 1937 11 Sheets-Sheet 5

INVENTORS
JOHN W. CHAMBERLIN
REX EARL BASSETT, JR.
BY Maurice W. Green
ATTORNEYS.

CLEANING TEXTILE AND SIMILAR MATERIALS

Original Filed March 6, 1937 11 Sheets-Sheet 6

INVENTORS.
JOHN W. CHAMBERLIN
REX EARL BASSETT, Jr.
BY Maurice W. Green
ATTORNEYS.

CLEANING TEXTILE AND SIMILAR MATERIALS
Original Filed March 6, 1937 11 Sheets-Sheet 7
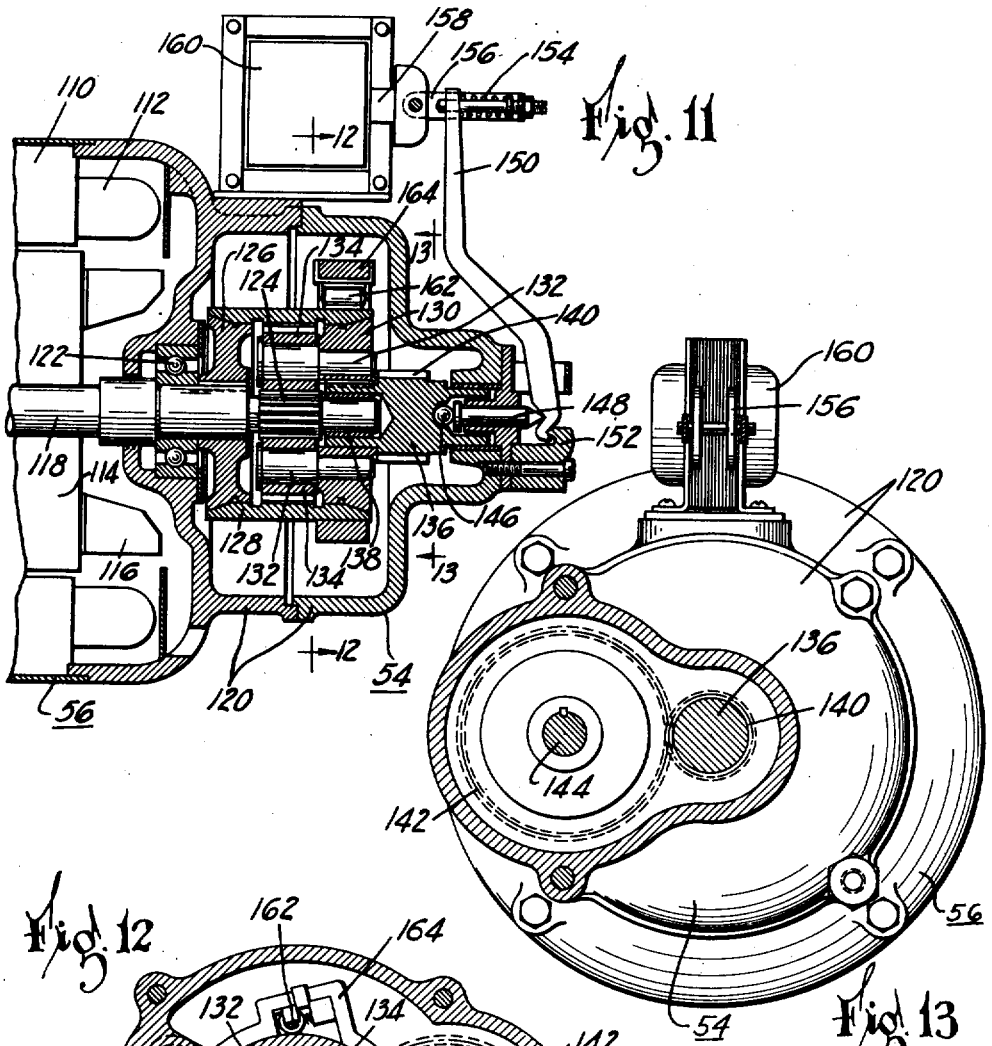
Fig. 11
Fig. 13
Fig. 12
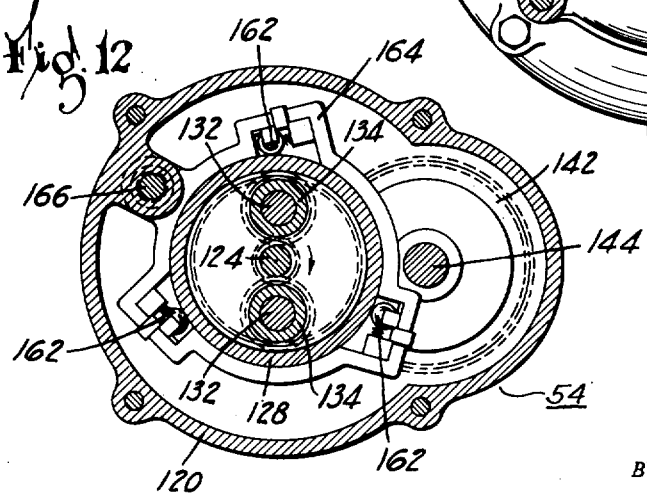
INVENTORS.
JOHN W. CHAMBERLIN
REX EARL BASSETT, Jr.
BY Manning & Green.
ATTORNEYS.

CLEANING TEXTILE AND SIMILAR MATERIALS

Original Filed March 6, 1937 11 Sheets-Sheet 8

INVENTORS.
JOHN W. CHAMBERLIN
REX EARL BASSETT, Jr.
BY Maurice W. Green
ATTORNEYS.

CLEANING TEXTILE AND SIMILAR MATERIALS

Original Filed March 6, 1937 11 Sheets-Sheet 9

Inventors.
John W. Chamberlin
Rex Earl Bassett, Jr.
By
Williams, Bradbury & Hinkle
Attys.

CLEANING TEXTILE AND SIMILAR MATERIALS
Original Filed March 6, 1937 11 Sheets-Sheet 10
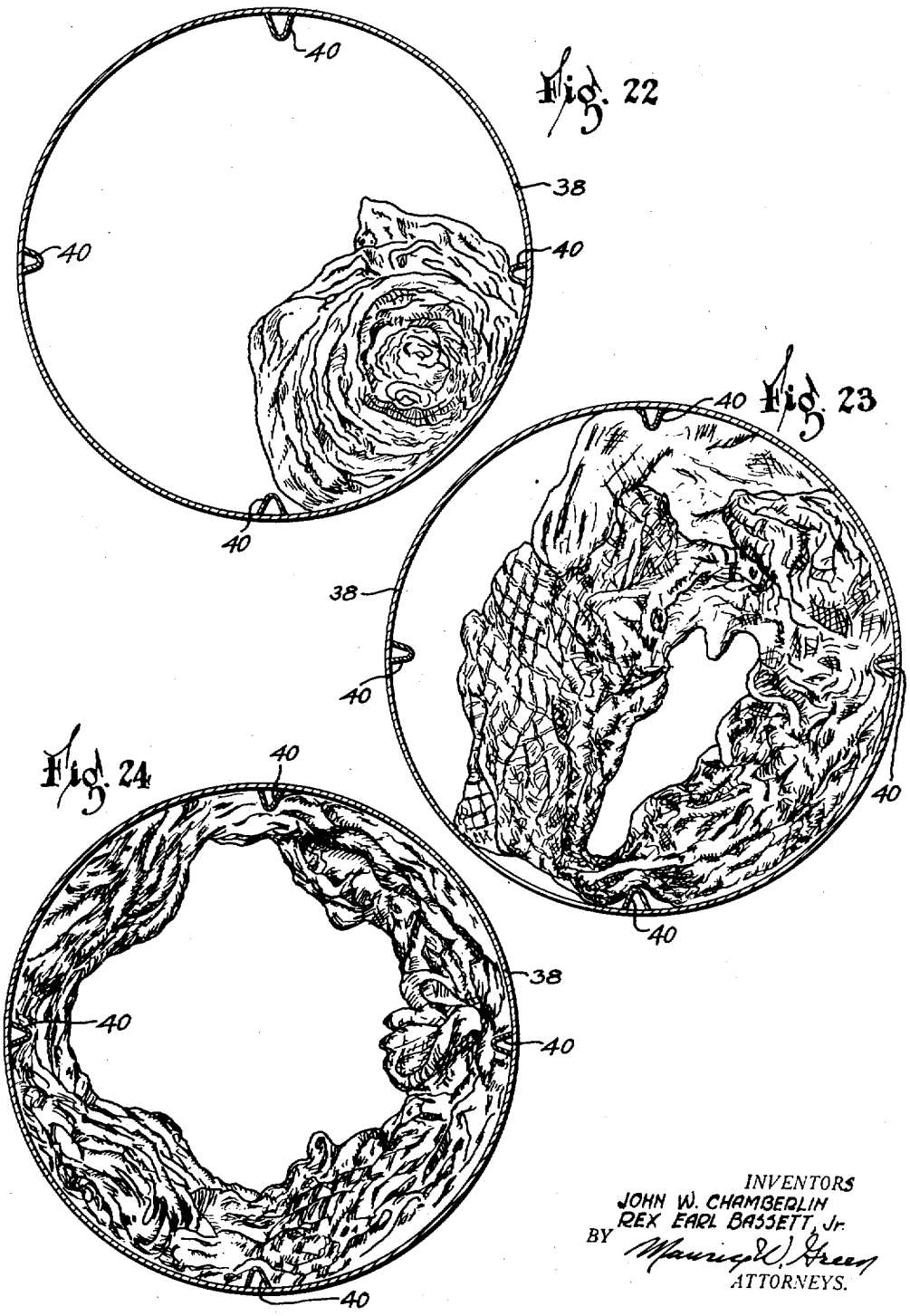
INVENTORS
JOHN W. CHAMBERLIN
REX EARL BASSETT, Jr.
BY Maurice W. Green
ATTORNEYS.

CLEANING TEXTILE AND SIMILAR MATERIALS

Original Filed March 6, 1937 11 Sheets-Sheet 11

INVENTORS
JOHN W. CHAMBERLIN
REX EARL BASSETT, JR.
BY Maurice W. Frear
ATTORNEYS.

Reissued Sept. 14, 1943

Re. 22,375

UNITED STATES PATENT OFFICE 22,375

CLEANING TEXTILE AND SIMILAR MATERIALS

John W. Chamberlin and Rex Earl Bassett, Jr., South Bend, Ind., assignors to Bendix Home Appliances, Inc., Detroit, Mich., a corporation of Delaware Original No. 2,165,884, dated July 11, 1939, Serial No. 129,429, March 6, 1937. Application for reissue August 3, 1940, Serial No. 351,072

18 Claims. (Cl. 8—159)

This invention relates to the washing and cleaning of clothes and similar materials, and is described below in connection with a washing and rinsing and drying machine operating automatically according to a definite cycle.

Horizontal rotary washers have many advantages, but heretofore they have been driven at relatively low speeds, and even then the clothes tangle to such an extent that it is necessary to reverse the direction of drive every few revolutions to permit the clothes to disentangle themselves again. This adds greatly to the time required for washing, and to the cost of building the machines.

An important feature of the present invention is based on the discovery that, while these washers must be periodically reversed when driven at low speeds, and while the efficiency is very low at high speeds, there is a narrow range of intermediate speeds at which the washer operates at high efficiency while driven continuously in the same direction. This also permits the building of a lighter and less expensive, as well as more efficient machine, as the considerable weight needed in prior machines is mainly on account of the large inertia forces set up in periodically reversing a heavy drum full of wet clothes.

This critical range of speeds is such that the clothes are carried by the drum up out of the wash water, and are then thrown clear of the drum to fall across the drum back into the wash water, while at the same time currents are set up in the wash water which also act on the clothes, bringing about a washing action of the water through the fabrics in an entirely new and extremely effective manner which also has the advantage of minimizing wear due to scrubbing action on the clothes. The manner of determining this speed, and various considerations relating to the depth of the wash water and to the clearance about the drum to permit the back currents necessary to given maximum effectiveness, is explained below in detail, as well as our own explanation of the attending phenomena.

We have also discovered that there is a slightly higher range of speeds at which, after the wash water is drained off, the clothes gradually distribute themselves uniformly about the drum ready for high-speed centrifugal drying or extraction. A very important consideration, which greatly facilitates designing a cyclic automatic machine for washing and drying the clothes without removing them from the drum, is that these two speed ranges overlap, so that there is a very narrow range of speeds at which clothes will "tumble" in washing as described, without tangling, so long as there is sufficient water in the machine, and when the water is withdrawn (but at approximately the same driving speed) the clothes will distribute themselves over the periphery of the drum without "tumbling," ready for high speed extraction. We are therefore able to control the action of the clothes, in "tumbling" during washing and thereafter in distribution ready for high-speed centrifugal drying, by controlling the water in the machine without any change in either the direction or speed of rotation of the clothes drum. This enables us to embody our invention in a very much simplified machine having a two-speed single-direction drive.

Based on the above-described novel method of operation made possible by our discoveries, we have designed an improved type of washing and cleaning machine having many novel features of construction and arrangement and operation of parts, which will be apparent from the following description of the illustrative machine shown in the accompanying drawings, in which:

Fig. 5 is a perspective view, from the front, of the base of the machine and the shaft-supporting brackets carried thereby;

Fig. 6 is a partial vertical section through the soap-door;

Fig. 7 is a partial vertical section through the upper part of the clothes door;

Figs. 11, 12 and 13 are sectional views showing one form.

Figs. 22, 23 and 24 are diagrammatic sections showing the action of the clothes in the drum at different speeds.

Figure 1:
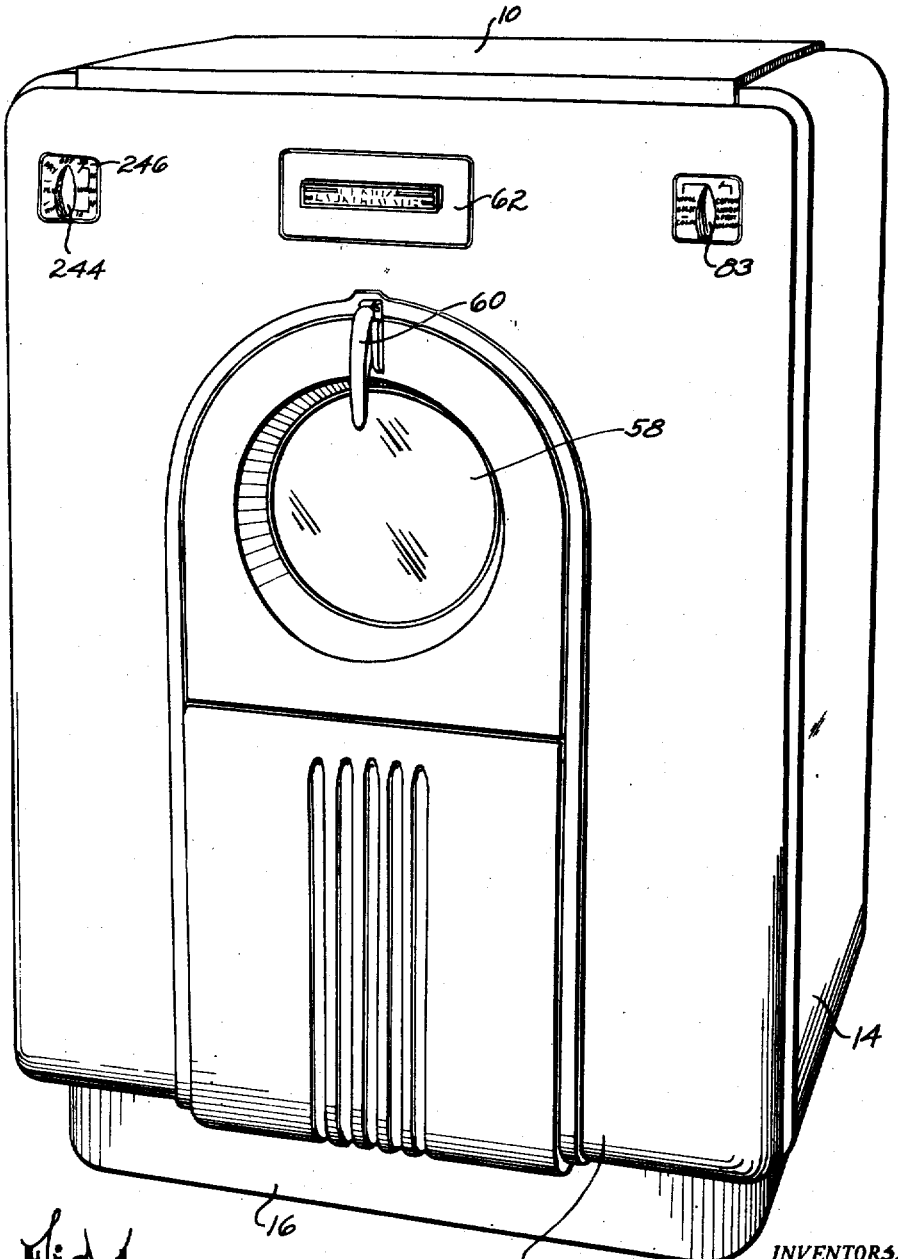
Fig. 1 is a perspective view showing the top and front and one side of the machine.

The illustrated machine comprises a casing consisting of suitable top and front and side panels 10 and 12 and 14, removably mounted in any desired manner on a base 16. If desired, various combinations of these panels may be made integral with each other, as for example the top panel 10 and one or more of the side panels 14.

As one convenient and rigid mounting for the tub and rotor parts described below, there may be secured to the rear of the base 16 a triangular bracket 18 having its peripheral portion of channel section to provide stiffness and strength, and provided with a central plate portion or web 20, and which carries a shaft bearing 22 at its apex. The base 16 also has secured to its forward portion one end of a second bracket 24 which has an inclined portion 26 leading to and through, and if desired rigidly secured to, the plate 20 and which then extends upwardly at 28 to support a second shaft bearing 30 spaced rearwardly from and alined with the bearing 22. A vertical third bracket 32 is shown mounted at the front of the base.

A cylindrical horizontal metal tub 34, covered with suitable heat and sound insulating material, is rigidly mounted between the brackets 18 and 32. Within the tub 34 is a rotatable perforated generally cylindrical drum or clothes container 38, formed with several baffles or inwardly-projecting ribs 40. The head of the drum 38 is radially ribbed or otherwise formed to stiffen it, and is secured to a head or spider formed or keyed or otherwise secured to one end of a shaft 42 journaled in the bearings 22 and 30. A U-section stamping 43 may be welded to the upper ends of the two shaft-supporting brackets, to tie them together and to hold the bearings 22 and 30.

The number of baffles has considerable effect on the manner in which the machine operates. For example, the efficiency of five baffles is high on low loads, average on medium loads, and rather poor on heavy loads. The efficiency of three baffles is near the average on all loads. The efficiency of four baffles is not high on low loads, but is above average on medium loads and is high on heavy loads. For a domestic machine, four baffles is the preferred number, because the machine is seldom operated with small loads.

Between the bearings 22 and 30 the shaft 42 is provided with a pulley 44 for a V-belt 46 passing over an idler pulley 48 adjustably mounted in a slot 50 in the plate portion 20 of the first bracket, and over a drive pulley 52 on the driven shaft of a two-speed transmission 54 rigidly connected to and driven by a main motor 56.

Figure 2:
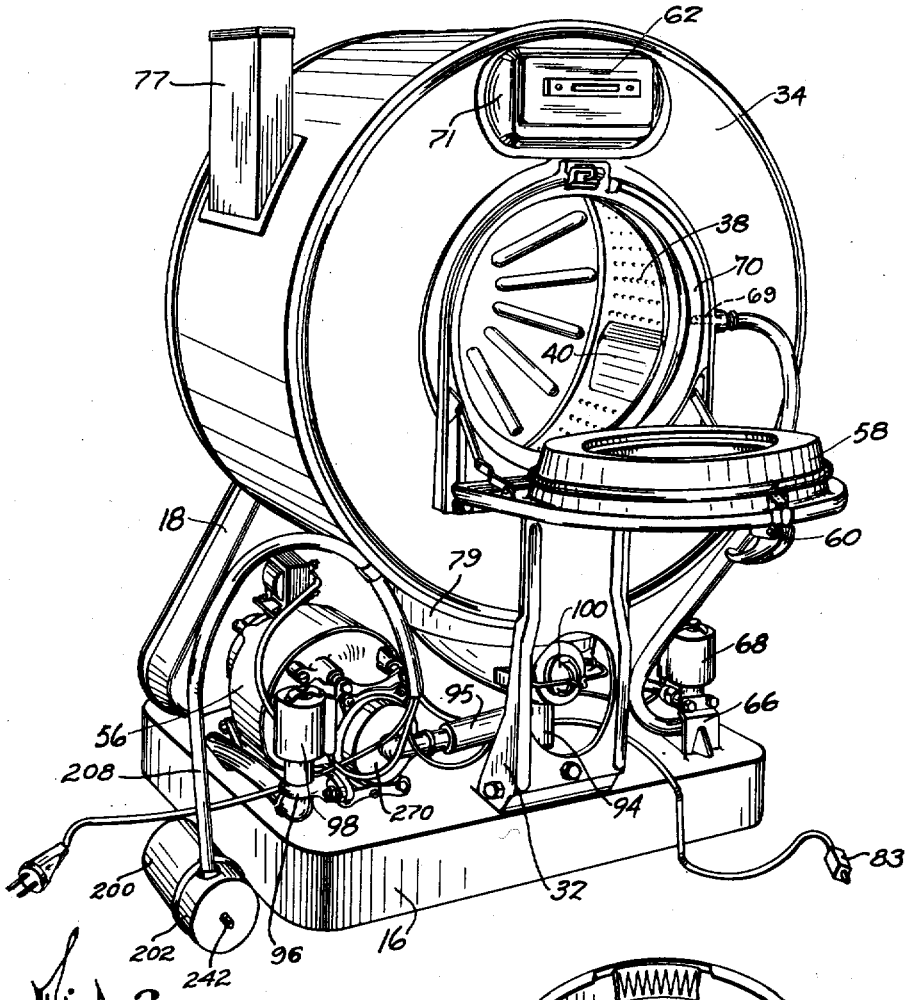
Fig. 2 is a perspective view of the machine from the front, with the outer casing removed.
Figure 3:
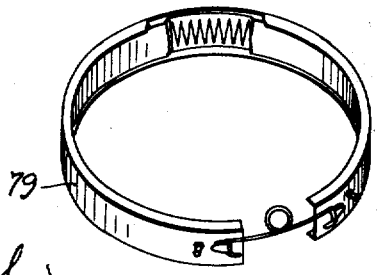
Fig. 3 is a perspective view of an electric heater element.
Figure 4:
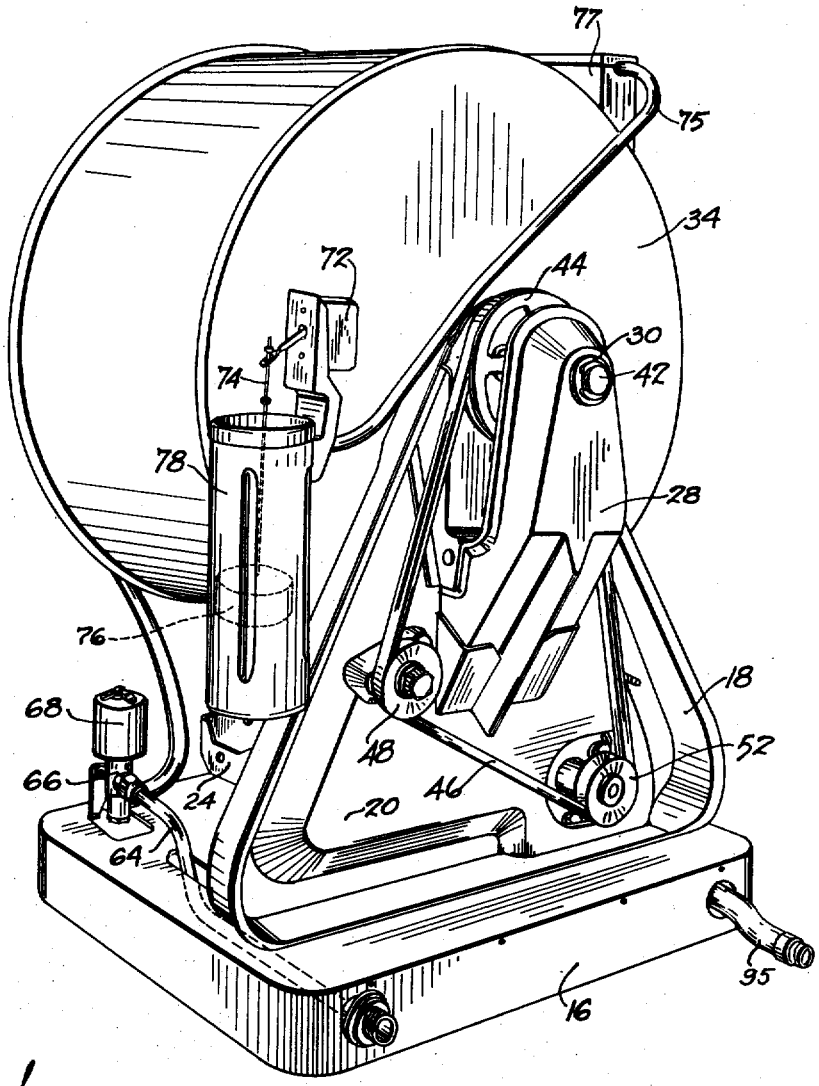
Fig. 4 is a perspective view of the machine from the rear, with the outer casing removed.
Figure 8:
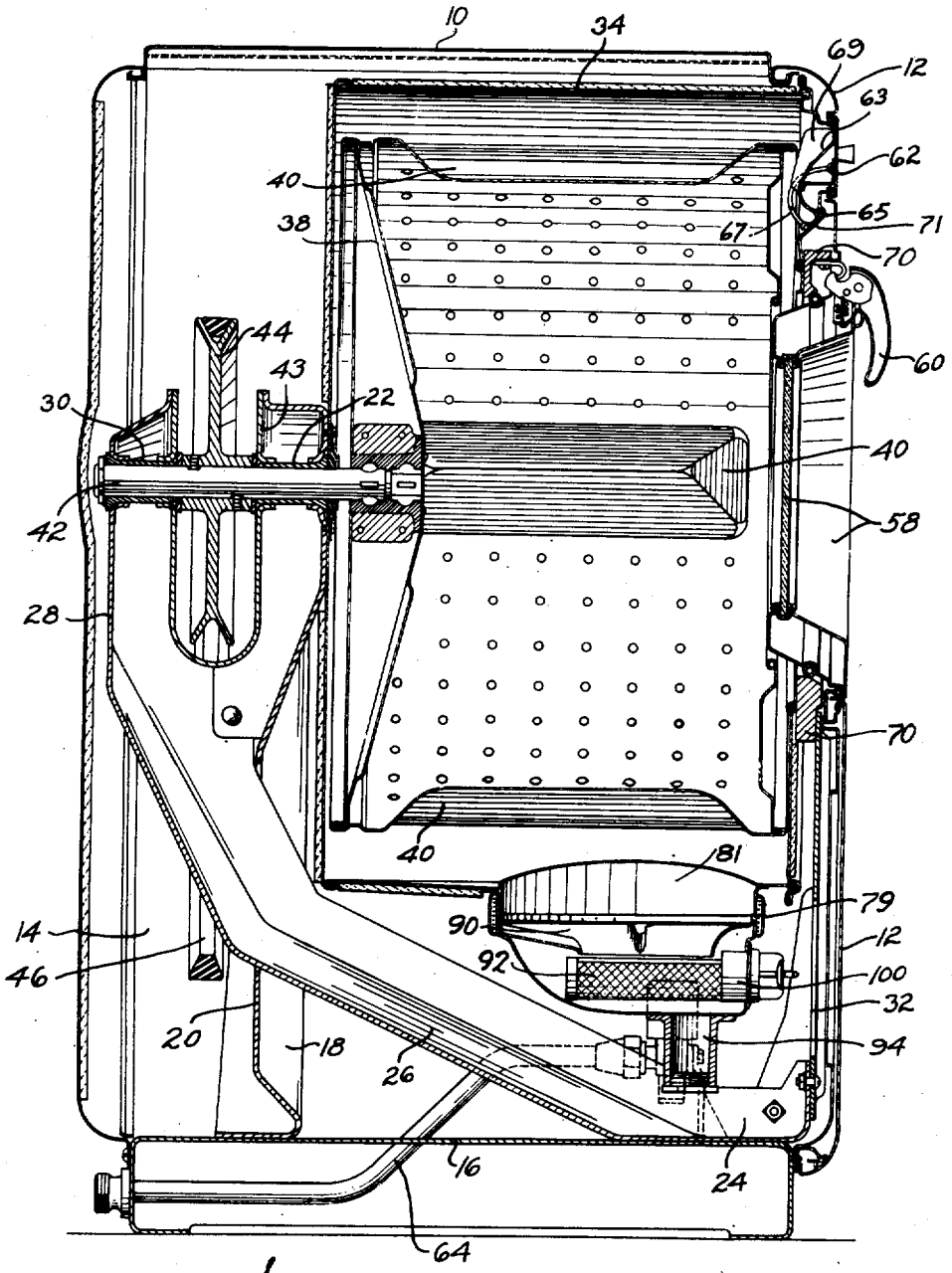
Fig. 8 is a vertical section through the machine in a plane passing through the axis of the tub and drum.

The tub 34 has pivoted thereto a clothes door 58 having a latch 60, and which swings either down to a horizontal or vertical position when open, as shown in Fig. 2. If means is provided for holding the door in a horizontal position, it forms a convenient support in front of the opening. The door preferably has its central portion made of glass, so that the washing action may readily be observed. According to one feature of our invention, adjacent and preferably above the door 58 there is mounted a soap door 62, through which soap powder or other detergent can be introduced while the machine is running and full of wash water, thereby permitting the operator to observe the formation of suds through the glazed door 58 and accurately control the amount of soap added.

The door 62 shown in the drawings is mounted on a bowed stamping 63 mounted on a pivot 65 inside the machine, so that it closes flush with the casing, and a bowed spring 67 acts on it in tension with a toggle action to hold it shut or open, according to whether the ends of the spring are in a line on one side or the other of the hinge 65. The door closes against a frame in the form of an annular stamping 71 secured to the tub 34 about the soap door opening therein. The stamping 63 is provided with wings 69, and is so shaped as to form a receptacle for soap powder when the door is horizontal, and to dump the soap powder into the machine when the door is swung shut to its vertical position. The arrangement just described is covered by our divisional application No. 231,653, filed September 26, 1938 now Patent No. 2,267,785.

Water, at the desired temperature, is introduced into the tub 34 through a hose connection 64, under the control of a valve 66 operated by a solenoid or the like 68, being injected into the tub through a nozzle 69, projecting through the frame 70 of the door 58.

As hereinafter more fully explained, the water level in the tub is determined by including in the circuit of the solenoid 68 a switch 72, the one illustrated being a double-acting switch operated to open and close two circuits, as hereinafter described, at predetermined high and low water levels, by spaced stops on a rod 74 carried by a float 76 in a float chamber 78 communicating with the interior of the tub 34.

The water is preferably injected at a temperature (e. g. 110° F.) suitable for washing woolens and the like. Instead of putting in hotter water in the first place when cotton materials are to be washed, we may inject the water at the lower (110°) temperature, and then heat it to raise the temperature (e. g. to around 160° F.) during the washing of the clothes. For example, an immersion heater, or an electric resistance heater, shown as a ring 79 surrounding the drain collar 81 at the bottom of the tub, may be provided. Preferably this heater is controlled by a switch 83 on the front panel 12. To inject the water at this predetermined temperature, the inlet line 64 may be connected to the outlet of a hot and cold water mixing device, which may if desired be constructed and arranged substantially as described in application No. 72,312, filed April 2, 1936, now Patent No. 2,146,929, by Rex Earl Bassett, Jr. This arrangement for raising the temperature of the suds during the washing operation is claimed in our divisional application No. 241,614 filed November 21, 1938, now Patent No. 2,279,656.

The housing 78 of the float mechanism may be utilized as a breather, to maintain constant atmospheric pressure in the tub 34 even when sealed up with the machine running, and to that end is connected by means such as a conduit 75 to a standpipe or the like 77 which contains suitable baffles to break up bubbles and prevent water splashing out through the conduit. This breather arrangement is more fully described and is claimed in application No. 130,444, filed March 12, 1937, now Patent No. 2,182,655, by Herbert C. Bowen.

The cleaning liquid used in the machine, for ordinary domestic washing, may be warm or hot water with a detergent such as a soap compound containing 72% pure soap, and 28% alkali and the like. This compound, while of greatest effectiveness with water having a hardness of 5.25 grains per U. S. gallon, is reasonably satisfactory even with absolutely soft water, where theoretically pure soap should be used, and is cheaper than pure soap.

We find it desirable to adjust the amount of soap accurately to each load, by feeding the soap compound (as previously explained) into the machine gradually through the soap door 62 while watching the formation of the suds through the door 58. Since the amount of soil varies in different loads and with different types of water, the amount of soap compound must be varied to correspond.

Woolen fabrics, and certain types of colored fabrics, are best washed at approximately 110° F., while for white and fast-color cotton fabrics the optimum temperature is 160° F. However, if cotton materials are placed in water at 110° F., and the temperature is increased gradually to 160° F., as explained above, the washing efficiency is some 18% higher than at a constant temperature of 160° F., and for this reason as previously explained, we prefer to supply the water at 110° F., and heat it (when cotton materials are being washed) to the 160° F. range of temperatures during the washing operation.

The drain collar 81 communicates, through a baffle 90 which directs the water through a screen or strainer 92, with a sump 94 drained by a suitable drain conduit 95 controlled by a drain valve 96 operated by a solenoid 98. A removable cover 100 permits access to the screen 92 for cleaning purposes.

While the machine has been described as rotatable about a horizontal axis, some variation is feasible, and the axis may be somewhat inclined, although the efficiency becomes very poor when the inclination is greater than 45°.

The two speeds desired for driving the drum may be secured by means of the two-speed motor, for example of the type described in application No. 127,191, filed February 23, 1937, now Patent No. 2,225,144, by Rex Earl Bassett, or by means of a two-speed transmission. Two such transmissions are illustrated in Figs. 11–13 and in Figs. 14–15.

The transmission 54 in the form of Figs. 11–13 is assembled in combination with the motor 56. This motor is illustrated as a split-phase induction motor having a stator 110 with a winding 112, and an armature 114 provided with a fan 116 and keyed on an armature shaft 118. The transmission is in a two part housing 120, one part of which also forms the end of the motor housing, so that the motor and transmission form one rigid unit. The shaft 118 is journaled in a bearing 122 in this housing.

The transmission is shown in its high-speed position. The end of the armature shaft 118 has a drive pinion 124 formed thereon, and has keyed thereto a cone clutch member 126 which is held by the bearing 122 against movement to the left. A ring gear 128 coaxial with respect to the shaft 118 has its ends formed with cone clutch surfaces, one of which cooperates with the clutch member 126, and the other of which cooperates with a conical clutch surface on a planet carrier 130 provided with pivot pins 132 for planet gears 134 driven by the pinion 124 and meshing with the teeth of the ring gear 128.

The planet carrier 130 is keyed to a driven shaft 136, shown as recessed to carry a pilot bearing 138 for the reduced end of the shaft 118, and which is formed with a drive pinion 140 meshing with and driving a driven gear 142 on a shaft 144 which projects exteriorly of the casing 120, and carries the drive pulley of the previously described belt drive for the drum.

The parts 126—128—130 are held clutched together to rotate as a unit, at high speed, by the axial thrust of the shaft 136 due to pressure through a ball 146 from a plunger 148 having its conical end forming the equivalent of a knife-edge fulcrum engaged by a recess in a lever 150 having a second recess fulcrumed on a knife-edge on a part 152 bolted to the transmission casing. The lever 150 is operated yieldingly by means such as a spring 154 engaged by a yoke 156 pivoted to the core 158 of a solenoid 160. The solenoid is shown mounted on top of the transmission casing.

Rotation of parts 126—128—130 as a unit, when clutched together by the energization of the solenoid 160, is permitted by a suitable one-way clutch, shown as including spring-pressed clutch rollers 162 in wedge recesses in a clutch ring 164 encircling the ring gear 128 and non-rotatably connected to the transmission casing by means such as a bolt 166.

When the solenoid 160 is de-energized, the parts 126—128—130 are de-clutched, whereupon pinion 124 drives the planet gears 134 on the ring gear 128, which is held against rotation backward by the one-way clutch 162—166, to rotate the planet carrier 130 and the shaft 136 at low speed.

Figure 14:
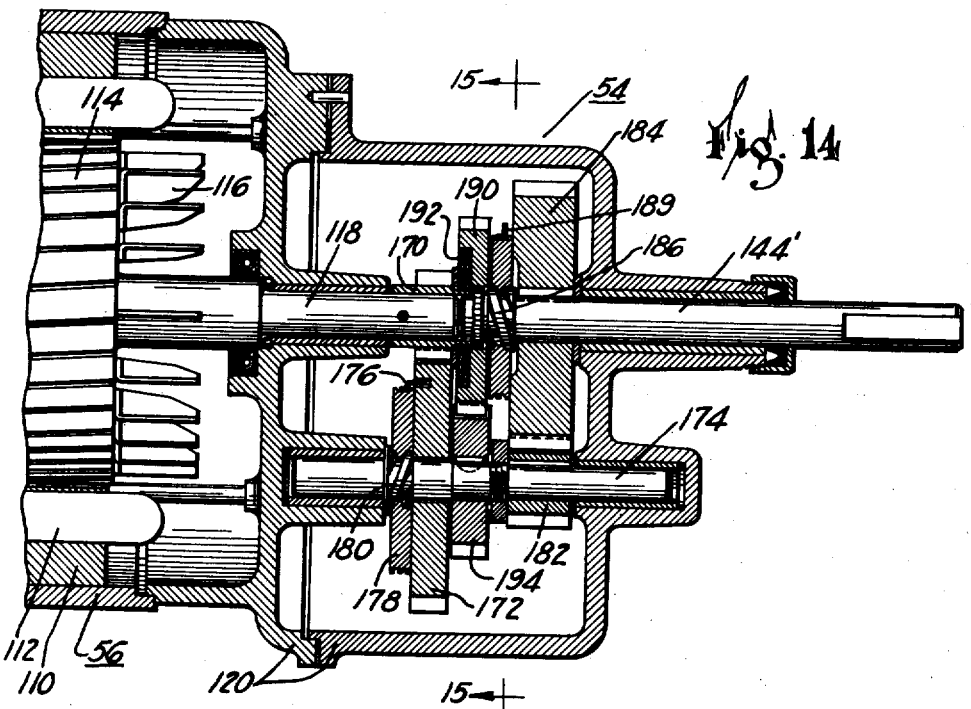
Figs. 14 and 15 are sectional views of an alternative form, of two-speed transmission, either of which may be used.
Figure 15:
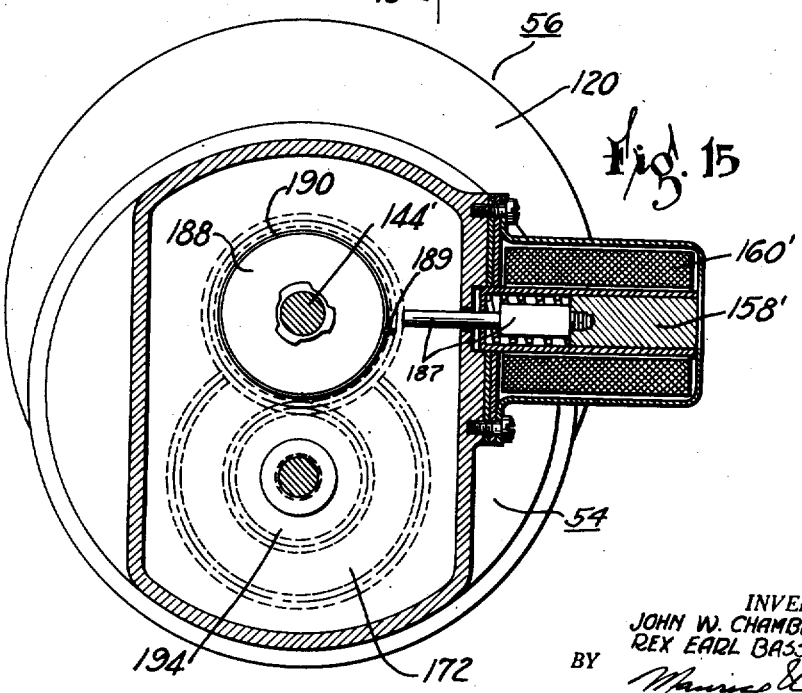

In the alternative transmission of Figs. 14 and 15, the motor armature shaft 118 drives a pinion 170 shown pinned to the shaft. The pinion 170, in low speed, drives a gear 172 loose on a countershaft 174. The gear 172 has in its side a socket receiving the laterally-bent end of a friction coil spring 176 wound on the periphery of a clutch disk 170, and in low speed the gear 172 winds the spring 176 in a direction to tighten its coils upon the clutch disk 178.

The clutch disk 178 is formed with a coarse screw thread meshing with a similar thread 180 formed on the shaft 174, so that the drag of the spring 176 in low-gear drive shifts the disk 178 axially to the right against the gear 172, to clutch the disk and gear together and cause the gear 172 to drive the shaft 174. The shaft 174 has keyed thereon a pinion 182 driving a gear 184 on a shaft 144', corresponding to shaft 144 of the first-described transmission, and which has secured thereto the drive pulley of the belt drive for the drum.

Adjacent the gear 184 the shaft 144' has sleeved thereon the extended hub of the drive pinion 170, which hub is formed with a screw thread 186 on which is mounted a disk 188 about the periphery of which is wound a coil friction spring 189 having its end turned outwardly to engage and be held by a plunger 187 attached to the core 158' of a solenoid 160' which is energized when high speed is desired.

The spring 189, when so held against rotation, tends to unwind, but still has sufficient frictional drag on the disk 188 to cause the latter to shift axially on the thread 186, to force toward the left a gear 190 loosely mounted on the hub of the pinion 170. The gear 190 has its opposite side recessed to receive a small multiple-disk clutch 192, alternate plates of which are keyed to the gear 190 and to the hub of the pinion 170. This clutches the gear 190 to the pinion 170.

The gear 190 drives (at higher speed) a gear 194 keyed on the shaft 174, and causes that shaft to rotate faster. This causes the thread 186 to turn in the disk 178 in a direction to back that disk off from gear 172. Since this tends to unwind the spring 176, it merely turns with a light frictional drag on the disk 178, since the disk 178 and the gear 172 are now unclutched and the disk is turning (with the shaft 174) faster than the gear.

The above-described transmission of Figs. 14 and 15 is claimed per se in application No. 120,700, filed January 15, 1937, now Patent No. 2,167,846, by Thomas B. Martin, since, while we may use it in the novel combinations embodied in our machine, the structure per se of this transmission is not of our invention.

Figure 9:
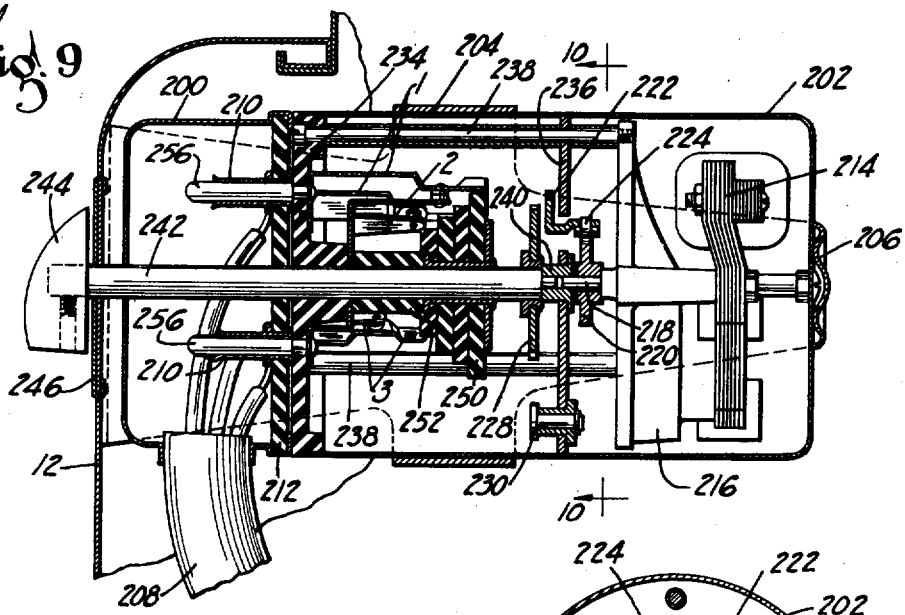
Figs. 9 and 10 are vertical sections, at right angles to each other, through one form of multiple control switch which may be used.
Figure 10:
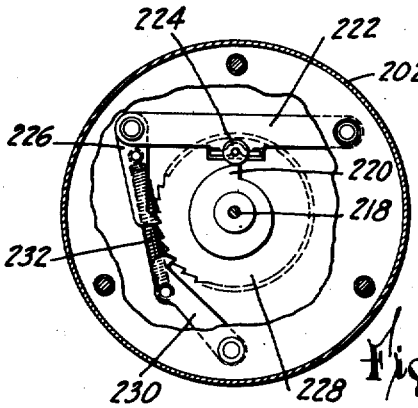

For controlling the cycle of operations, we may use the multiple cyclic switch described, and claimed per se, in application No. 78,635, filed May 8, 1936, now Patent No. 2,180,948, by Rex Earl Bassett, Jr. Another cyclic switch which may be used is shown in Figs. 9 and 10 of the attached drawings, and is substantially the same as that claimed in application No. 240,163, filed November 12, 1938, now Patent No. 2,254,509, by Rex Earl Bassett, Jr. This switch includes a separable two-part housing 200, 202 carried by a bracket 204 provided with a spring catch or retainer 206 and which is mounted on the front panel 12. A cable 208 is made up of the various electric connections from the valve solenoids, the motor, etc., and each of these connections is secured to one of a plurality of sockets 210 carried by an insulator plate 212 forming the rear face of the housing part 200.

The housing part 202 has mounted therein an electric motor 214 connected in parallel with the motor 56 (see Figs. 18 and 20), and which is a self-starting motor of some kind, preferably a synchronous motor or the like. This motor 214 drives a suitable reduction gearing 216 (not shown in detail) which in turn drives a shaft 218 at a speed, for example, of one revolution per minute. If preferred, the shaft 218 may be connected, for example by a flexible shaft, directly to the main motor 56.

The shaft 218 is shown as provided with a cam 220 (note Fig. 10) which once each revolution gradually lifts and then suddenly drops a pivoted lever 222 having a cam roller 224 riding on the periphery of the cam 220. Each downward movement of the lever 222 causes a pawl 226 pivoted thereto to advance by one tooth a ratchet 228, a holding pawl 230 preventing retrograde movement of the ratchet. A spring 232 tensioned between the pawls 226 and 230 holds both pawls against the ratchet 228, and also serves to urge the lever 222 downwardly toward the cam 220.

An insulator plate 234 forming the front end of the casing section 202 is connected to a partition 236 by insulated tie rods 238 which extend rearwardly to support the drive unit consisting of the motor 214 and the reduction gear 216. The partition 236 carries a bushing 240 which serves as a bearing for the shaft 218, and also for the reduced rear end of a main timer camshaft 242 on which the ratchet 228 is mounted.

The shaft 242 is also journaled in the front plate 234, and extends forwardly through the casing section 200 and through the front panel 12, and has detachably mounted thereon a suitable indicator handle 244 moving over a scale 246 (Fig. 1) which is graduated to indicate the cycle of the machine. By removing the handle 244, the casing section 202 with the mechanism inclosed therein, and including the shaft 242, can be removed bodily for adjustment or repair, without disturbing the connections 208.

The shaft 242 has fixed thereon a series of Bakelite cams 250, shown mounted in a unit on a sleeve 252 which is pressed onto the shaft, to raise and lower the outer contacts of a series 1, 2, 3, 4 (or 1a, 2a, 3a, 4a, 5a in Fig. 20) of spring contacts mounted on the face plate 234, and forming a series of control switches. The contacts are connected to plugs 256 adapted to be detachably inserted in the sockets 210, for the double purpose of connecting the casing sections 200 and 202 and electrically connecting the leads 208 with the switches 1, 2, 3, 4, etc.

Figure 18:
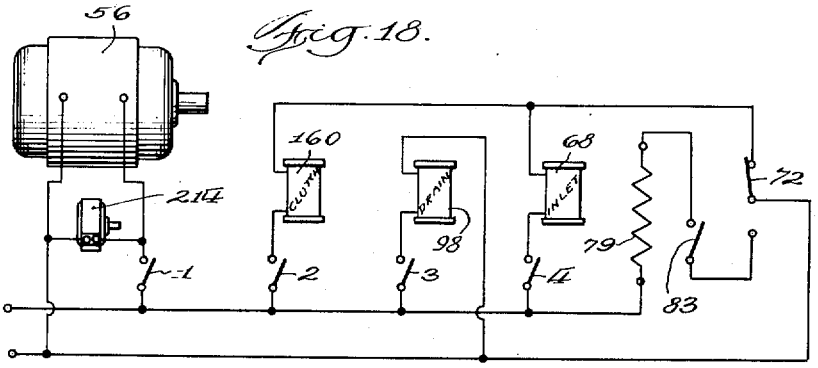
Fig. 18 is a wiring diagram of the machine.
Figure 20:
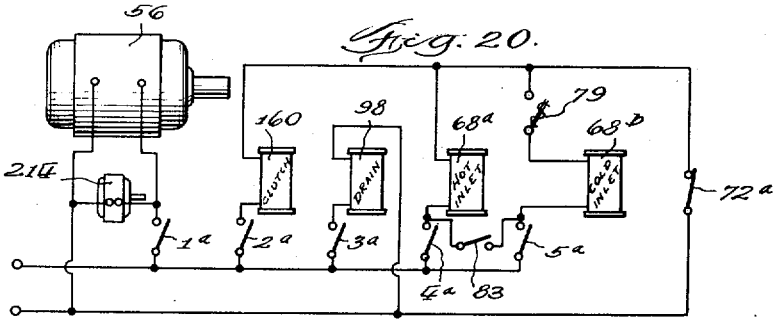
Fig. 20 is a wiring diagram of a modification of the machine in which controls are provided for hot and cold water lines, instead of supplying water from a single source at a predetermined desired temperature as in Fig. 18.

It will be noted from the wiring diagrams in Figs. 18 and 20 that switch 1 controls both motors 56 and 214, switch 2 the high-speed clutch solenoid 160, switch 3 the drain valve solenoid 98 and switch 4 the inlet valve 68, or 68a in the alternative arrangement of Fig. 20.

By turning the indicator handle 244 forward (which is permitted by the ratchet 228, which can turn forward but not backward) the switch 1 is closed, and this switch remains closed, to cause the two motors to operate, until the end of the cycle. Also, the indicator handle 244 may when desired be turned forward over part of the "wash" period, to shorten it by that much when the full period will not be required. From there on the control switch causes the machine to operate automatically for the remainder of the cycle.

Figure 16:
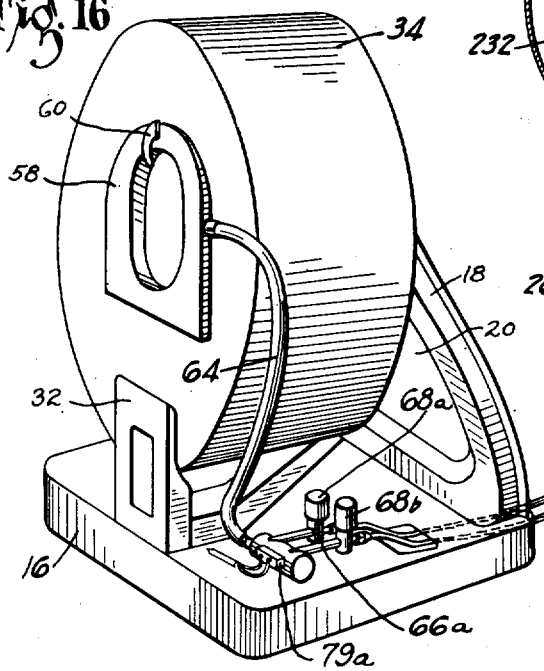
Figs. 16 and 17 show an alternative arrangement for supplying water.
Figure 17:
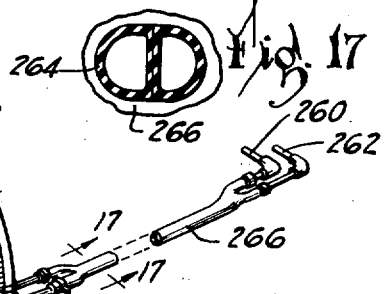
Figure 21:
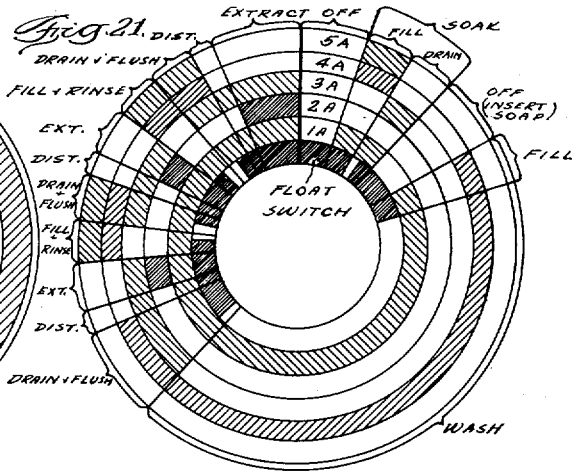
Fig. 21 is an operating diagram to accompany Fig. 20.

Figs. 16 and 17 illustrate an alternative arrangement, in which no heater is used, and hot and cold water are mixed in the machine, and which may be used with the wiring of Fig. 20 and the cycle of Fig. 21. In this arrangement the hot and cold water pipes 260 and 262 are connected to two hose elements 264 inclosed in a heat-insulating cover 266 to form a heat-transfer means by which the cold water is partially heated before reaching the machine. The hot water hose connects to the inlet hose 64 directly through a valve 66a operated by a solenoid 68a operatively controlled by the switch 4a. The cold water is controlled by a second valve operated by a solenoid 68b. This solenoid 68b is connected in series with a thermostatic switch 79a and with switches 5a (cyclic) and 83 (manual) arranged in parallel. The switch 83 is in series with the switch 4a. When switch 83 is closed, the thermostatic switch 79a controls the cold water supply regardless of the switch 5a, whenever the switch 4a is closed.

In order to facilitate the draining of the tub 34, a water pump 270 may be mounted on the end of the motor 56, and driven by that motor, between the tub 34 and the drain valve 96. The pump is not necessary if there is a gravity drain, but is essential when the water has to be lifted against gravity into a set-tub or the like.

Fig. 7 illustrates one form of latch which may be used for the clothes door 58. In this arrangement the latch handle 60 is pivoted at the top of the door, coaxially with a separate latch member 272 connected to the handle by a lost-motion pin-and-slot connection 274. The latch member 272 forms a toggle with a compression spring 276 which holds the latch member 272 either closed or open until manipulation of the handle 60 moves the toggle to and past its central position with the parts in line. The latch member 272 is preferably formed with a U-shaped recess for the stationary hook-shaped retainer 278, so that when the door is slammed shut the impact of the latch member 272 itself will cause shifting of the toggle past center to a position where spring 276 holds the door tightly shut.

A clothes receptacle or drum 38 having a volume of approximately 3600 cubic inches is required for efficiently washing a quantity of textiles weighing nine pounds when dry, with a proper quantity of water; however, the machine will operate reasonably satisfactorily if the load does not exceed six pounds per cubic foot of cylinder capacity. One axial end of the receptacle or drum is preferably left open, as previously described, for the insertion and removal of the textiles, the shaft upon which the receptacle rotates being located at the other end. The preferred dimensions for a cylinder of this capacity are a diameter of twenty inches and a length of twelve inches. These dimensions give a volume of approximately 3769.92 cubic inches, and the theoretical optimum load is 9.5 pounds dry weight of textiles, as hereinafter more fully explained.

Baffles may be provided if desired, on the vertical back and front walls of the drum or on other surfaces contacted by the textiles, as well as the baffles 40 projecting inwardly from the periphery. At any rate some irregularity of the periphery of the cylinder is highly essential. No very great difference exists between baffles having cross-sectional angles from 0° to 60°, in the particular machine herein illustrated. When the angle is increased beyond 60°, however, efficiency drops rapidly until almost zero efficiency is reached at 180°.

In present commercial practice the height of the baffles averages 22.2% of the diameter of the cylinder. In domestic practice baffles having a height that is 20% of the diameter of the cylinder are usually used. Such high baffles are necessary to lift the clothes in a low-speed cylinder, as the clothes gather in front of the baffles. Low baffles have a desirable scrubbing action on the clothes, but cannot be used with these low-speed machines. We have determined that in our machine the highest efficiency is reached with baffles having a height that is 7.5% of the diameter of the cylinder. It is believed that in this optimum construction a balance is struck between the lifting action of high baffles and the scrubbing action of low baffles.

In one cylinder twenty inches in diameter which we have used very successfully, the baffles were one inch and a half high, with a cross-sectional angle of 45°. The table below summarizes the comparative efficiencies of baffles of various heights, at high speeds of rotation, expressed as the quantity of dirt removed in a certain standard washing operation.

| Proportion of cylinder diameter, per cent | Height in inches | Dirt removed |
|---|---|---|
| 5 | 1 | 79.10 |
| 7.5 | 1½ | 99.00 |
| 10 | 2 | 89.65 |
| 15 | 3 | 89.10 |
| 20 | 4 | 74.45 |
| 25 | 5 | 68.20 |

In the operation of the machine described above, the clothes are inserted in the drum 38, the load preferably being from 1¼ pounds to 4½ pounds per cubic foot of drum volume, i. e. in the illustrated machine approximately from 2½ to 9½ pounds. When the cyclic control switch is started, warm wash water is injected into the tub 34 until it reaches a depth which is preferably approximately 25% of the drum cylinder diameter, i. e., five inches for a twenty-inch drum. There should be a clearance between the drum and the tub sufficient for the back currents of the water; this clearance should be at least 20% and preferably 25% of the water depth.

This load is about double that which can be handled in the usual low-speed machine; for example, one of these prior machines with a 20-inch cylinder 12 inches deep would be restricted to a load of about 5 pounds instead of an optimum load of 9½ pounds and a maximum of about 12 pounds in our machine.

Based on the best observations we have been able to make, our explanation of the theoretical background of the invention is as follows. At low rotational speeds, the centrifugal force acting on the clothes is not sufficient to hold them against the drum to any considerable height, so they soon tangle up into a ball as shown in Fig. 22, and merely roll around with very little washing action. This is why prior low-speed machines must periodically be reversed to untangle the clothes.

When the speed is increased to the point where the centrifugal force at the drum periphery is 50% or more of the gravitational force acting on the clothes, the clothes stop rolling into a ball and the tangling is less. When the centrifugal force at the drum periphery reaches about 85% of the gravitational force, the clothes are carried nearly to the top of the drum and then fall back across the drum, traversing a path which is roughly an ellipse. At this speed, which is expressed generally, in revolutions per minute, by the formula $$\sqrt{\frac{2500}{\text{drum radius in feet}}}$$

a very effective optimum washing action takes place, and there is very little tangling.

At speeds exceeding this, up to that a little below that at which the clothes are held against the drum all the way around, tangling disappears entirely and the washing action, while slightly less than at the optimum speed, is well within satisfactory limits. The washing is much less efficient, of course, at still higher speeds where the clothes cease to "tumble" across the drum as described above.

Figure 25:
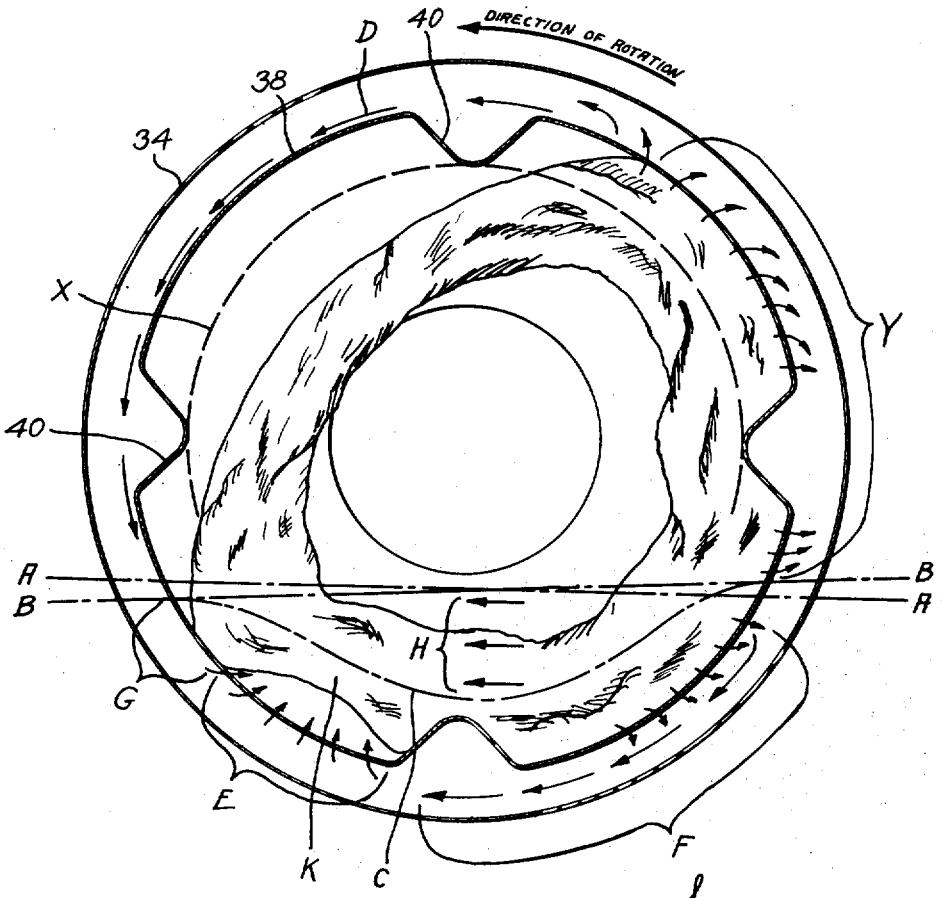
Fig. 25 is a diagram showing the washing action of the machine.

When the clothes are being tumbled as described, at such a speed that the centrifugal force at the drum periphery is around 100% (or even slightly more) of the gravitational force, as the clothes are lifted with the water by the rotating cylinder, as illustrated in Fig. 25, parts of the clothes and part of the water are beyond a critical circle X (Fig. 25) where, except for water action, the clothes would be held against the cylinder all the way around, the centrifugal action over-balancing gravity. As the drum turns, the water outside of this critical circle is thrown centrifugally out through the drum perforations and drains back down to the bottom of the tub.

Part of the water, and parts of the clothes, being inside the critical circle X, as the drum approaches the zenith position, tend to fall back across the drum, the clothes tending to drag with them also that part of the load which is beyond the critical circle. Due to their inertia, they fall across the drum as shown in Figs. 23 and 25, to a point on the opposite lower side of the drum.

When the water drains away, the clothes tend to arrange themselves outside the critical circle X, where (without the downward drag of the water) they remain against the drum. Thus, after the water is drained away, the clothes gradually distribute themselves, mostly in the zone outside the critical circle X where the centrifugal force is 100% (or more) of the gravitational force.

Experiments on wet clothes without preliminary washing show that the best speed for distributing the clothes in the drum is that at which the circle X is quite close to the drum, i. e. at which the centrifugal force at the drum periphery is approximately 100% of the gravitational force, or even slightly more. This is, in revolutions per minute, approximately determined by the formula $$\sqrt{\frac{3000}{\text{drum radius in feet}}}$$

We believe that one important feature of our invention is in the great simplification of the machine made possible by our discovery that at a speed approximating, or slightly below, the one determined by this formula, clothes will have a satisfactory washing action with a single direction drive when there is water in the machine, and will also distribute properly when the water is drained out.

The above action, especially the washing action, depends to some extent also on the load in the machine, on the water level, and on the clearance between the drum and the tub. The minimum load that will "tumble" in the novel described manner during washing is about 1¼ pounds of dry clothes per cubic foot of drum volume, and the maximum that will distribute effectively is about 4½ pounds per cubic foot of cylinder (drum) volume, although effective washing takes place up to six pounds per cubic foot of drum volume. Thus in the illustrated machine, with a 20-inch drum, to wash and distribute effectively, the load should be between 2½ to 9½ pounds (dry weight).

The water level is also important. Below about 20% of the drum diameter, the water does not operate effectively to cause the described "tumbling" of the clothes. At about 25% of the drum diameter (i. e. 5 inches with a 20 inch drum) an optimum condition is reached where there is a maximum "tumbling." Above 30%, as the increasing water level causes more flotation and less tumbling of the clothes, and as the one action interferes with the other the effectiveness drops considerably.

Above about 40% to 50%, up to a point where the cylinder is nearly full, an effective washing action is secured by the agitation of the clothes floated in the water. This last is an effective type of washing, although less so than with the "tumbling" described as a 25% water level, but it requires a great deal of water and soap. Where this is not a serious drawback, an efficient washing machine can be used utilizing a water level of from 45% to 90% of the drum diameter, and most of the mechanical features of our invention are highly advantageous in such a machine.

The optimum water level, however, is around 25%, and at least between 22% and 30% of the drum diameter, with the scrubbing action due to the described "tumbling," together with economy of water and soap.

It is also important, as above explained, especially with the optimum water level and with the clothes "tumbling" as described, to have a clearance between the tub and the drum which is at least 20% and preferably 25% of the water level (i. e. at least 1¼ inches with a 20-inch drum). Greater clearance does not seem to affect the efficiency much either way, but increases the amount of water used. The clearance is not of very critical importance in floating the clothes with the water above 45% of the drum diameter, as the return currents described below are only as described when the clothes are "tumbling."

Fig. 25 is a diagram of what happens under optimum conditions. It is assumed that we have in this figure a 20-inch drum containing about 6 pounds of clothes and driven at 60 revolutions per minute, with a 5-inch static water level, and with 1½ inch clearance between drum and tub. The drum is turning counterclockwise.

The clothes are lifted from the bottom of the drum, with a great deal of water, and in the area Y most of the water is forced out radially into the tub as indicated by the arrows. The water level in the tub changes slightly from the static level A—A to an inclined level B—B. Inside the drum the water level drops to the curve C. The water forced out into the tub in the area Y drains back down clockwise into the bottom of the tub.

The clothes, with most of the rest of the water, fall away from the top of the drum in a curved path which is the resultant of the centrifugal and gravitational components, and are thrown across the drum above its axis, back into the wash water at the bottom. A little water is carried all the way around by the drum, as indicated by the arrows D.

Water flows back into the drum mainly as indicated by arrows E, in an area just above the bottom of the drum on the side from which the drum is turning. This is because the water by the time it has reached the bottom of the drum has again picked up enough centrifugal force, added to the head inside the drum indicated by the line C, to balance the head (B—B) outside the drum. Water reaches the area E mainly along three paths: (1) the back-flowing water from area Y, indicated by arrows F, (2) a small eddy G due to the fact that the area E is slightly below the level B—B, and (3) a horizontal flow of water in the tub around the front and back walls of the drums (arrows H). A little water is also carried around by the drum (arrows D).

The inflow of water at E lifts the materials being washed away from the drum, as indicated at K. This inflow takes place continuously, and insures that no articles of clothing will stick to the drum.

The critical water level (i. e. about 25% of the drum diameter) is that level at which the head of water outside the drum is sufficiently greater than the head within the drum plus the centrifugal force on the water within the drum, to cause the above-described inrush of water at E.

With the described water level and drum clearance, and with a load within the described limits, the speed of rotation should be between (in revolutions per minute)

$$\sqrt{\frac{2500}{\text{drum radius in feet}}}$$

at which speed there is the maximum washing action, and about $$\sqrt{\frac{3000}{\text{drum radius in feet}}}$$

at which speed there is a satisfactory washing action with a maximum distributing action after draining out the water. We prefer to use a speed substantially at the upper limit of this range, as perfect distribution is more important than a few minutes greater washing time. While, therefore, the upper limit of this range may vary a few revolutions per minute above or below that derived from the formula, on account of variations in water level or drum clearance or the like, as explained above, a very small increase in speed above the limit set forth in the above formula causes a marked loss of washing efficiency, and upon an increase of even a few revolutions per minute with the defined water level the clothes will cease to "tumble" altogether.

The clothes during distribution are illustrated in Fig. 24.

Withdrawing the water at the end of the washing period allows the clothes to rotate in a larger ellipse than when the water is present and if the washing speed has been at the top of the critical range, the clothes will rotate almost in contact with the drum. Withdrawing the water at the end of the washing period may also decrease the load on the motor so that the speed steps up slightly, whereupon the ellipse expands until it almost fills the drum. The garments however can still move freely relatively to each other, and during the distribution period they do shift around the moving ellipse until they are substantially uniformly distributed about the drum. Upon then shifting the drive into high speed, the ellipse suddenly expands against the drum periphery and thereafter rotates with the drum, being pressed centrifugally outward against the drum throughout its rotation.

The length of time the clothes are washed can, if desired, be reduced by turning the multiple control switch ahead as previously explained. At the end of this period, the drain valve opens, and the dirty wash water runs out. This closes the float switch again, and (since the inlet valve is open) injects clean water to flush out the clothes. Before the clothes can begin to distribute themselves as described below, the drain valve may if desired be closed again, to give a rinsing period during which the clothes are "tumbled" in clean water. Or if preferred the drum may be operated at high speed for a short time, after the draining, and then the tub refilled with clean rinse water and the clothes again "tumbled." The drain valve finally opens to give a final short flushing period. If desired, there may be more than one of these rinsing periods.

Thereafter, the drain valve remaining open, the inlet valve finally closes, the drum still being driven at its lower speed. It will be noted that the distribution period that follows the last opening of the drain valve includes a time (usually about one minute) when the clothes are first substantially in the washing and rinsing part of the cycle, and then as rinse water is injected while the drain remains open, to give the final flushing action, the clothes gradually lose their load of water, and begin to distribute themselves gradually uniformly about the periphery of the drum. If the motor is not so powerful but that, as the load on the motor decreases as the water drains out, the motor speed steps up a few revolutions per minute, this will bring the speed to a still more effective speed for distribution; however, this is not necessary although it is usually desirable to use such a motor because of considerations of cost, since its use is not detrimental.

The second part of this period, after the closing of the inlet valve, and which is usually about another minute, sees the clothes lose enough water (partly by merely draining off and partly by the low-speed centrifugal action of the drum) to become dry enough to give approximately uniform distribution about the cylinder, "tumbling" gradually ceasing and the ellipse of moving clothes gradually expanding until it almost fills the drum. With very heavy loads there may remain a little "tumbling" of a garment or two clear at the center, but not enough even then to produce substantial unbalance of the drum when it is speeded up.

Thus, by selecting a speed which will cause "tumbling" when there is water in the tub, and which is also within the range which will cause distribution when the water is drained out, it becomes possible to drive the drum constantly at a single speed and in one direction only, until ready for the high speed extraction step. The control is by controlling the intake and drain of the water, rather than by complicated speed varying controls such as have always heretofore been considered necessary.

Finally, as already explained, the transmission is shifted into high speed for a period of time long enough to extract most of the water, leaving the clothes substantially ready for ironing, and then the cycle automatically comes to a close. Almost immediately upon the increase in speed, the clothes which are undergoing distribution in a shape which is roughly elliptical, expand out against the drum and cease all "tumbling."

Figure 19:
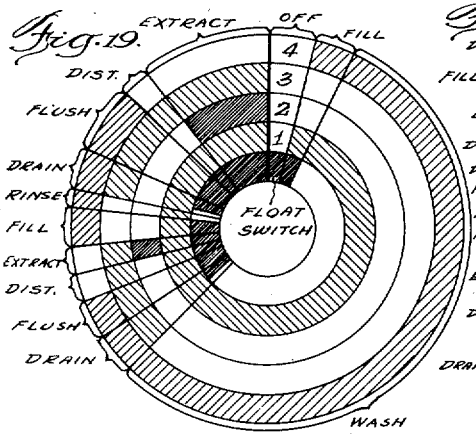
Fig. 19 is an operating diagram thereof.

The details of the above-described cycle of operations will be apparent by comparing Figs. 18 and 19. Fig. 18 shows the wiring of the two motors 56 and 214, the multiple switches 1, 2, 3, and 4, the solenoids 160, 98, and 68, the heater 79, the double-acting float switch 72, and the manual switch 83 in series with the heater 79, and their connections to the usual 110 volt line wires. Fig. 19 shows a cycle of the machine (45 minutes long) with concentric zones indicating the switches 1, 2, 3, and 4 and the float switch 72. It will be noted that this switch in one position (tub filled to the desired level with water) closes the circuit through the heater 79 if the switch 83 is closed, so that the heater cannot be turned on unless the tub contains water. In its other extreme position the switch is in the circuit for the clutch solenoid 160, so that the transmission cannot be shifted into high speed unless the tub is emptied of water.

In this cycle the multiple switch, after a segment in which all switches are off, and beyond which the multiple switch is turned manually to start the machine, causes the machine to operate in the following sequence: (1) adjustable washing period, with the float switch opening as soon as the tub is filled to the desired level, (2) drain valve opens and, as soon as the water level drops enough to open the inlet valve, rinse water is sprayed in to give a flushing period, (3) a distribution period which in practice is merged in the latter part of the flushing period as the water drains away, (4) a short high-speed extraction period, (5) rinsing by tumbling the clothes in clean water, (6) drain and flush, (7) distribute, and (8) extract at high speed, a total of about 45 minutes.

By leading hot and cold water conduits 264 into the machine as described in connection with Fig. 16, and providing hot and cold water valves controlled by the solenoids 68a and 68b, the heater 19 may be eliminated, and the wiring of the diagram of Fig. 20 and the cycle illustrated in Fig. 21 may be used. In this case the hot water is connected directly to the main inlet valve controlled by the solenoid 68a, and is on whenever that valve is open, while the cold water valve has its solenoid 68b in series with the thermostat switch 19a and connected to the line through switches 5a and 83 in parallel.

Thus if switch 83 is closed, the cold water goes on whenever the switch 4a operates the solenoid 68a, provided the water is hot enough to operate the switch 19a, so that mixed water is used all through the cycle. If, however, switch 83 is open, inspection of Fig. 21 will show that during the washing period the cold water is turned off regardless of the thermostat 19a, and high temperature water is used; however, during the second (or both) of the two rinse periods switch 5a is closed and mixed water is used.

In the cycle of Fig. 21, there is first (after advancing the multiple switch to start the machine) a soaking period during which the machine is filled with mixed warm (110°) water and then drained, leaving the clothes thoroughly soaked, whereupon the machine stops. The operator then comes back as soon as convenient, and again starts the machine by advancing the multiple switch, at the same time adding soap powder until he sees that suds of the desired soapiness have formed.

There then follows the steps (after washing is completed) of (1) drain and flush, (2) distribute, (3) extract, (4) fill and rinse, (5) drain and flush, (6) distribute, (7) extract, (8) fill and rinse, (9) drain and flush, (10) distribute, and (11) extract. The total running time is about one hour. The steps indicated as (7), (8), (9), and (10) may if desired be omitted.

While one particular machine and its operation have been described in detail, it is not our intention to limit the scope of the invention by that description, or otherwise than by the terms of the appended claims. The above-described brackets for supporting the tub are claimed in application No. 135,955, filed April 9, 1937, now Patent No. 2,190,456, by Alfred H. Haberstump, and application No. 135,954, filed April 9, 1937, now Patent No. 2,190,455, by Andrew O. McCollum and —Lovett—.

We claim:

1. That method of cleaning fabric materials such as clothes, by the manipulation of a rotatable generally cylindrical and generally horizontal drum, which comprises rotating the loaded drum continuously in one direction with its lower portion dipping into a cleaning liquid and at such a speed that the wet materials are held centrifugally against the rotating drum until near the uppermost position thereof and then drop by gravity into the cleaning liquid, said sped being in the range (in revolutions per minute) between $$\sqrt{\frac{2500}{\text{drum radius in feet}}}$$

as a minimum and about $$\sqrt{\frac{3000}{\text{drum radius in feet}}}$$

as a maximum, withdrawing the cleaning liquid from the drum, distributing the materials in an annulus substantially uniformly about and spaced from the axis of the drum and in contact with the wall of the drum by rotating the drum in the same direction as before and at the same speed but without cleaning liquid, and extracting the cleaning liquid from said materials centrifugally after they are so distributed by driving the drum in said direction at a much higher speed.

2. That method of cleaning fabric materials such as clothes, by the manipulation of a rotatable generally cylindrical and generally horizontal drum, which comprises rotating the loaded drum continuously in one direction and dipping into cleaning liquid maintained at a level between 20% and 30% of the drum diameter and with a clearance around the drum adequate to permit back flowing currents and not less than 20% of the liquid level and at a speed in the range (in revolutions per minute) between $$\sqrt{\frac{2500}{\text{drum radius in feet}}}$$

as a minimum and about $$\sqrt{\frac{3000}{\text{drum radius in feet}}}$$

as a maximum, whereby the materials are carried by the drum on each revolution to a point near the top of the drum and then fall clear of and across the drum into the cleaning liquid at the bottom of the drum.

3. That method of cleaning fabric materials such as clothes, by the manipulation of a rotatable generally cylindrical and generally horizontal drum, which comprises rotating the loaded drum continuously in one direction and dipping into cleaning liquid maintained at a level between 20% and 30% of the drum diameter and with a clearance around the drum adequate to permit back-flowing currents and not less than 20% of the liquid level and at a speed approximately (in revolutions per minute)

$$\sqrt{\frac{2500}{\text{drum radius in feet}}}$$

4. That method of cleaning fabric materials such as clothes, by the manipulation of a rotatable generally cylindrical and generally horizontal drum, which comprises rotating the loaded drum continuously in one direction and dipping into cleaning liquid maintained at a level between 20% and 30% of the drum diameter, and with a clearance around the drum adequate to permit back-flowing currents and not less than 20% of the liquid level, and at a speed in the range (in revolutions per minute) between $$\sqrt{\frac{2500}{\text{drum radius in feet}}}$$

as a minimum and about $$\sqrt{\frac{3000}{\text{drum radius in feet}}}$$

as a maximum, whereby the materials are carried by the drum on each revolution to a point near the top of the drum and then fall clear of and across the drum into the cleaning liquid at the bottom of the drum, and thereafter draining the liquid away while continuing to rotate the drum at the same speed and in the same direction for a considerable period of time to cause said materials to distribute themselves gradually in a generally annular formation about and spaced from the axis of the drum and in contact with the wall of the drum and partially to extract the cleaning liquid therefrom, ready for high-speed final extraction.

5. That method of cleaning fabric materials such as clothes, by the manipulation of a rotatable generally cylindrical and generally horizontal drum, which comprises rotating the loaded drum continuously in one direction and with its lower portion dipping into cleaning liquid and with a clearance around the drum adequate to permit back-flowing currents and at a speed in the range (in revolutions per minute) between $$\sqrt{\frac{2500}{\text{drum radius in feet}}}$$

as a minimum and about $$\sqrt{\frac{3000}{\text{drum radius in feet}}}$$

as a maximum, whereby the materials are carried by the drum on each revolution to a point near the top of the drum and then fall clear of and across the drum into the cleaning liquid at the bottom of the drum, and thereafter draining the liquid away while continuing to rotate the drum at the same speed and in the same direction for a considerable period of time to cause said materials to distribute themselves gradually in a generally annular formation about and spaced from the axis of the drum and in contact with the wall of the drum and partially to extract the cleaning liquid therefrom, ready for high speed final extraction.

6. That method of cleaning fabric materials such as clothes, by the manipulation of a rotatable generally cylindrical and generally horizontal drum, which comprises rotating the loaded drum continuously in one direction and dipping into cleaning liquid maintained at a level between 20% and 30% of the drum diameter, and with a clearance around the drum adequate to permit back-flowing currents and not less than 20% of the liquid level, and at a speed in the range (in revolutions per minute) between $$\sqrt{\frac{2500}{\text{drum radius in feet}}}$$

as a minimum and about $$\sqrt{\frac{3000}{\text{drum radius in feet}}}$$

as a maximum, whereby the materials are carried by the drum on each revolution to a point near the top of the drum and then fall clear of and across the drum into the cleaning liquid at the bottom of the drum, and thereafter draining the liquid away while continuing to rotate the drum at the same speed and in the same direction for a considerable period of time to cause said materials to distribute themselves gradually in a generally annular formation about and spaced from the axis of the drum and in contact with the wall of the drum and partially to extract the cleaning liquid therefrom, ready for high-speed final extraction, and injecting more cleaning liquid to pass through the clothes and be drained away during the first part of the distributing step to flush dirty cleaning liquid from the clothes and to cause the distribution to start gradually.

7. That method of cleaning fabric material such as clothes, by the manipulation of a rotatable generally cylindrical and generally horizontal drum, which comprises rotating the loaded drum continuously in one direction and with its lower portion dipping into cleaning liquid and with a clearance around the drum adequate to permit back-flowing currents and at a speed in the range (in revolutions per minute) between $$\sqrt{\frac{2500}{\text{drum radius in feet}}}$$

as a minimum and about $$\sqrt{\frac{3000}{\text{drum radius in feet}}}$$

as a maximum, whereby the materials are carried by the drum on each revolution to a point near the top of the drum and then fall clear of and across the drum into the cleaning liquid at the bottom of the drum, and while the drum is rotating in the same direction and at the same speed drawing off cleaning fluid to lower the level thereof within the drum whereby the materials commence to distribute themselves in a generally annular formation injecting more cleaning liquid to pass through the clothes and be drained away during the first part of the distributing step to flush dirty cleaning liquid from the clothes and to cause the distribution to continue gradually but completely upon the withdrawal of all of the water from the drum.

8. A washing machine comprising a substantially cylindrical receptacle for holding materials to be washed and a detergent, mounted for rotation on a substantially horizontal axis, substantially constant speed means for rotating the receptacle in one direction only at a speed in the range in revolutions per minute between $$\sqrt{\frac{2500}{\text{recepticle radius in feet}}}$$

and about $$\sqrt{\frac{3000}{\text{receptacle radius in feet}}}$$

at which speed the pieces of material are kept moving freely relatively to one another while the receptacle is rotating continuously in one direction so long as there is washing solution in the receptacle, and are distributed in an annulus substantially uniformly about and spaced from the axis of the receptacle and in contact with the wall of the receptacle when the washing solution is drained away, and additional means for rotating said receptacle at a much higher speed for centrifugally extracting washing solution from the material therein, means for draining the washing solution from said receptacle while the receptacle is rotating at the lower speed, and automatic means effective after the receptacle has rotated for a short interval at the lower speed without the presence of washing solution for changing from the lower speed to the higher speed.

9. A washing machine comprising a tub, a drum in said tub, means for driving the drum at low and high speeds for washing and extracting, and float-means controlled by the level of liquid in said drum and preventing the operation of said means at high speed until the wash water is drained out of the drum.

10. A washing machine having a tub containing a drum, a motor driven two-speed transmission for driving the drum at low and high speeds for washing and extracting, an electric circuit including means for shifting the transmission from low to high speed, and switch means in series in said circuit and having a float by which it is controlled and which float is controlled by the level of liquid in said drum for preventing the operation of said transmission at high speed until the wash water is drained out of the drum.

11. A washing machine having a tub containing a drum, means for driving the drum at low and high speeds for washing and extracting, and an electrical circuit controlling the speed of said means and having arranged therein a switch which must be closed to give high-speed operation and which is operated by a float controlled by the level of the water in the tub so that it remains open until the tub has been drained below the level of said drum.

12. A washing machine comprising a tub, a drum in said tub, a driving motor, a speed-changer for changing the speed of rotation of said drum without materially affecting the speed of rotation of said motor, two electric switches, both of which must be operated to set said speed-changer for high speed operation of said drum, one of said electric switches being responsive to the discharge of washing liquid from the tub to a predetermined quantity, either of said switches which is operated first serving to condition said speed-changer so that the operation of the other of said switches sets the speed-changer for high speed operation of said drum.

13. A washing machine having a tub containing a drum, means including a motor and two-speed transmission driven thereby for driving the drum at low speed with its lower portion dipping into washing liquid for washing and at high speed when most of the liquid has been removed from the drum for extracting, and means responsive to the amount of liquid in the drum controlling said transmission for effecting a change-over from low to high speed operation of said drum when the amount of liquid in the drum lowers to a predetermined minimum value, said means being effective for preventing said transmission from effecting a change-over from low to high speed operation of said drum while the liquid in said drum is lowering to such predetermined minimum value.

14. A washing machine having a tub containing a drum, means for driving the drum at low speed with its lower portion dipping into washing liquid for washing and at high speed when most of the liquid has been removed from the drum for extracting, and means including a pair of switches controlling said driving means to effect high speed operation thereof, one of said switches being a control switch for initiating high speed operation of the driving means and the other being a safety switch actuable by the amount of liquid in the tub for preventing high speed operation until a predetermined minimum amount of liquid remains in the drum.

15. That method of cleaning fabric materials such as clothes by the manipulation of a drum rotatable about a relatively horizontal axis, which comprises tumbling and thereby washing the materials by rotating the loaded drum continuously in one direction which is from $$\sqrt{\frac{2500}{\text{drum radius in feet}}}$$

to $$\sqrt{\frac{3000}{\text{drum radius in feet}}}$$

with its lower portion dipping into a cleaning liquid, removing the cleaning liquid from the drum, distributing the materials in an annulus substantially uniformly about and spaced from the axis of rotation of the drum and in contact with the wall of the drum by rotating the drum in the same direction and at substantially the same speed while removing the cleaning liquid from the drum, and thereafter extracting the liquid from the materials in the drum centrifugally after they are so distributed by rotating the drum in said one direction at a much higher speed.

16. In a combined washing, distributing, and centrifugal extracting machine, a drum for holding materials to be washed mounted for washing, distributing and extracting rotation on a generally horizontal axis, a washing liquid holding tub surrounding the drum, electrically operated liquid inlet and drain valves for the tub, drive means including an electric motor for rotating said drum continuously in the same direction at one speed only for washing and distributing which speed is substantially $$\sqrt{\frac{3000}{\text{drum radius in feet}}}$$

and at a much higher speed for extracting, a sequence switch, circuits controlled by said sequence switch in one position to charge the drum with a predetermined level of liquid and for causing the drive means to rotate the drum at said one speed for washing, means automatically to advance the sequence switch to a subsequent position, circuits controlled by the sequence switch when in the latter position for causing the drain valve to open to discharge liquid from the drum and for causing the drive means to rotate the drum at said one speed for distributing the washed materials about the wall of the drum and spaced from the axis of the drum in an annulus, means automatically to advance the sequence switch to its next position, and a circuit controlled by the sequence switch in said next position for causing the drive means to rotate the drum at said higher speed for extracting washing liquid from the washed and distributed materials.

17. In a combined washing, distributing, and centrifugal extracting machine, a drum for holding materials to be washed mounted for washing, distributing and extracting rotation on a generally horizontal axis, a wall for said drum substantially concentric with the axis of rotation of said drum, a washing liquid holding tub surrounding the drum, electrically operated liquid inlet and drain valve for the tub, drive means including an electric motor for rotating said drum continuously in the same direction at any speed for washing and distributing which speed is in the range of $$\sqrt{\frac{2500}{\text{drum radius in feet}}}$$

as a minimum to $$\sqrt{\frac{3000}{\text{drum radius in feet}}}$$

as a maximum and at a much higher speed for extracting, a sequence switch, circuits controlled by said sequence switch in one position to charge the drum with a predetermined level of liquid and for causing the drive means to rotate the drum at said lower speed for washing, circuits controlled by the sequence switch in another position for causing the drain valve to open to discharge liquid from the drum and for causing the drive means to rotate the drum at said lower speed for distributing the washed materials in an annulus about and spaced from the axis of the drum and in contact with the wall of said drum, and a circuit controlled by the sequence switch in a further position for causing the drive means to rotate the drum at said much higher speed for extracting washing liquid from the washed and distributed materials.

18. In a device of the character described, a washing liquid containing tub, a material containing drum for material to be washed mounted for rotation therein on a substantially horizontal axis, a motor, and means for rotating said drum from said motor comprising, a low speed transmission for rotating said drum at a washing speed accurately predetermined to impress upon the material in said drum a centrifugal force at the inner peripheral wall thereof substantially equal to the gravitational force exerted on said material, means to supply washing liquid to said tub to maintain the lowermost part of said drum immersed to insure saturation of said material to cause the inertia of said material and washing liquid to overcome said centrifugal force substantially at the uppermost part of said drum's rotation and thereby to cause said material to fall away from said wall producing a tumbling washing action, means to lower the level of said washing liquid in said tub below that at which the inertia of the water will overcome said centrifugal force thereby to cause the continued rotation of said drum at said predetermined speed to distribute said material in an annulus substantially uniformly about and spaced from the axis of the drum and in contact with the wall of the drum, and high speed transmission means for rotating said drum from said motor for centrifugal drying of said material.

JOHN W. CHAMBERLIN.
REX EARL BASSETT, Jr.